United States Patent [19]

Rubio

[11] 4,179,282
[45] Dec. 18, 1979

[54] METHOD FOR THE REDUCTION OF METAL OXIDES

[75] Inventor: Charles A. Rubio, Houston, Tex.

[73] Assignee: CVG-Siderurgica del Orinoco, C.A., Venezuela

[21] Appl. No.: 904,976

[22] Filed: May 11, 1978

[51] Int. Cl.² ............................................. C21B 13/00
[52] U.S. Cl. ........................................................ 75/35
[58] Field of Search ............................. 75/26, 34–38, 75/91

[56] References Cited

U.S. PATENT DOCUMENTS

| 2,900,247 | 8/1959 | Celada | 75/34 |
| 3,128,174 | 4/1964 | Celada | 75/34 |

Primary Examiner—M. J. Andrews
Attorney, Agent, or Firm—Pravel, Gambrell, Hewitt, Kirk, Kimball & Dodge

[57] ABSTRACT

A method for the production of sponge metal by the gaseous reduction of metal oxides in iron ore to sponge iron, wherein metal oxided iron ore is initially preheated to or near reduction with a hot oxygen-free gas stream produced by the combustion of a fuel with no more than a stoichiometric amount of an oxygen-containing gas. The preheated ore is then reduced by contact with a hot reducing gas stream which has been preheated by intimate mixing with a hot oxygen-free heating gas stream. The hot oxygen-free gas stream is produced by the combustion of a fuel with no more than a stoichiometric amount of an oxygen-containing gas. The intimate mixing of the reducing gas and the oxygen-free heating gas rapidly raises the temperature of the reducing gas without depleting any reducing components thereof before the heated reducing gas is passed over the oxided iron ore. The resulting body of reduced sponge metal is then cooled with a cool gas stream which, in a preferred embodiment, is provided by circulating a portion of effluent gas from the preheating step and/or the reducing step.

15 Claims, 3 Drawing Figures

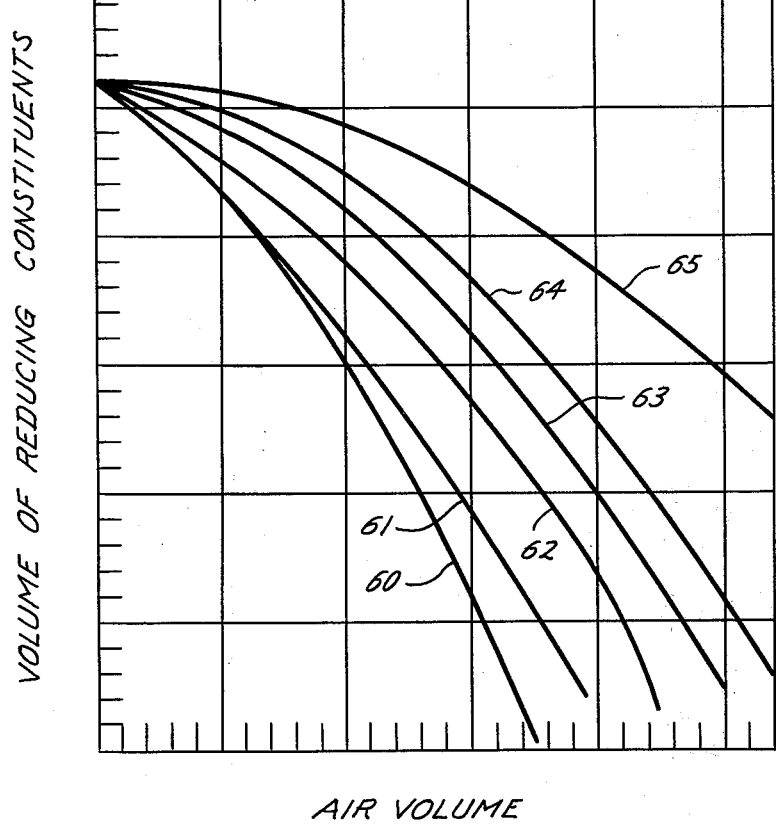

METHOD FOR THE REDUCTION OF METAL OXIDES

BACKGROUND OF THE INVENTION

1. Field of the Invention

The present invention relates to the direct gaseous reduction of metal oxides to metals at elevated temperatures below the sintering or fusion points of the metals.

2. Description of Prior Art

The direct gaseous reduction of metal oxides in iron ore to produce sponge metal is well-known in the art. Generally, known sponge metal producing processes contact a metal oxide containing ore, e.g., iron ore, with a reducing gas stream composed primarily of hydrogen and carbon monoxide at an elevated temperature below the melting point of the metal and is thus distinguishable from known blast furnace processes where the ore is melted. During such contacting, the metal oxide is reduced essentially to elemental metal with concurrent formation of porosity in metal ore particles, hence, the term "sponge metal" or "sponge iron". Although the general process has heretofore been employed for producing a wide variety of sponge metals, it has been particularly utilized on a large scale industrially for producing sponge iron as feedstock for conventional blast furnace operations.

Heretofore, known sponge metal production processes have been carried out semi-continuously in fixed bed multiple-unit reactor systems or continuously in moving bed reactor systems, usually vertical shaft moving bed reactor systems. In semi-continuous processes employing multiple reactor systems, separate bodies of the oxided iron ore material are treated in separate reactors. Conventionally, the plurality of reactors are interconnected with each other and with a source of reducing gas, comprised primarily of hydrogen and carbon monoxide. At a given period of time in operation, (1) a hot reducing gas stream is passed through at least one reactor for reducing the metal oxide (reduction stage); (2) a cooling gas stream, usually reducing gas obtained directly from a gas production source or partially depleted reducing gas recirculated from a reduction stage reactor, or mixtures thereof, is simultaneously passed through a second reactor (cooling stage); and, (3) a third reactor is being unloaded of just-produced sponge metal and loaded with fresh metal oxide-containing material for treatment (loading-unloading or production stage). During a cycle of the semi-continuous process, the gas streams are switched in a known manner to cause the cooling reactor to become the production reactor, the production reactor to become a reduction reactor and the last reduction stage reactor, to become the cooling reactor. Such switching is continued after each cycle whereby each load of metal oxide-containing material charged in a given reactor is subjected to all three stages of operation.

In conventional continuous processes employing moving bed vertical shaft reactor systems, the metal oxide-containing material is continuously passed through a vertical shaft reactor having at least a reducing zone and a cooling zone successively positioned which are respectively interconnected with sources of heated reducing gas and cooling gas streams. The preheated reducing gas is passed through the reducing zone cocurrently or countercurrently through the metal-containing material as it passes through the reducing zone for reduction of the metal oxides. Similarly, the cooling gas, usually recirculated partially spent reducing gas or cool reducing gas obtained directly from a production source, is passed through the cooling zone and reduced metal material as it passes from the reducing zone through the cooling zone.

Although the semi-continuous fixed bed multi-reactor and continuous moving bed vertical-stage reactor systems have specific operative differences, the basic processing steps are substantially the same for the production of sponge metal, i.e., (1) contacting a metal oxide-containing material with a heated reducing gas for reduction, and (2) contacting the resulting reduced sponge metal with a cooling gas for cooling. Accordingly, the problems associated with processes carried out in either or both systems are similar.

Over the years numerous processes for improving the production of sponge metal employing either and/or both multi-stage and vertical shaft reactor systems have been patented. Perhaps, the most significant and commercially successful process is that described in U.S. Pat. No. 2,900,247. The process of U.S. Pat. No. 2,900,247 is a process employing a multi-reactor system wherein the hot reducing gas used in the reduction stage is produced by combusting or burning a portion of preheated reducing gas generated by a catalytic reformer with a preheated oxygen-containing gas. As described in the patent, the combustion or burning of a portion of the reducing gas raises the temperature of the resulting gas mixture to 1800° F. to 2250° F. which is then passed through the metal oxide-containing ore in the reduction stage reactor to effect high conversion of the ore in a reduced time period.

As known, optimal conversion of metal oxide-containing ores to sponge metal is achieved at as high a temperature as possible below the melting point of the metal. Previously, the reducing gas had been preheated by employing indirect heat exchange superheaters and the like. However, in actual operation, such indirect heat exchange could only raise the reducing gas temperature to about 1600° F. and, accordingly, left much to be desired. Hence, the process of U.S. Pat. No. 2,900,247 was a significant advancement over the state of the art at that time.

However, in actual commercial operation the basic process of U.S. Pat. No. 2,900,247 has several disadvantages, the primary disadvantage being that significant amounts of reducing components, i.e., hydrogen and carbon monoxide, are consumed during burning or combustion with the oxygen-containing gas to raise the temperature of the reducing gas. Such consumption greatly increases the amount of reducing gas required to be supplied to the system for producing a given volume of sponge metal and, accordingly, adversely affects the economics of the process.

U.S. Pat. No. 3,128,174 describes an improvement in the reducing gas heating procedure of the basic process of U.S. Pat. No. 2,900,247 wherein an oxygen-containing stream is separately preheated by combusting or burning a gaseous hydrocarbon fuel with an excess quantity of the oxygen-containing stream prior to mixing with the reducing gas stream to provide a portion of the heat required for raising the temperature of the reducing gas. The separately preheated oxygen-containing stream is then mixed with the reducing gas stream and a portion of the reducing components thereof are similarly burned or combusted. Hence, the process of U.S. Pat. No. 3,128,174 suffers from the same disadvantages of reducing gas component consumption as the process of U.S. Pat. No. 2,900,247.

U.S. Pat. No. 3,827,879 describes another supposed improvement in the basic process just described which includes establishing a closed loop reducing gas circuit and the elimination of a conventional catalytic reformer plant for supplying the reducing gas. In U.S. Pat. No. 3,827,879, the reducing gas circuit is provided by a reactor in the reduction stage of the above-described multi-reactor system, a combustion chamber connected to the reactor for preheating the reducing gas and suitable piping for recirculating partially spent reducing gas from the reactor to the combustion chamber. Methane is supplied to the reducing gas circuit and reduced sponge metal is disposed either in the reactor or the combustion chamber and is employed as a catalyst for reforming the methane to produce more reducing components. However, the reducing gas is still heated in accordance with the basic process of U.S. Pat. No. 2,900,247 by supplying oxygen to the combustion chamber for burning or combusting a portion of the reducing components of the reducing gas stream.

Another significant problem associated with the process as described in U.S. Pat. No. 2,900,247, and similar processes employing this reducing gas heating technique, is that essentially all the heat required for the reduction of the metal oxide-containing material is supplied by the heated reducing gas stream as it is passed through the ore in the reduction reactor(s) or zone(s). See also U.S. Pat. Nos. 3,136,623; 3,136,624; and 3,136,625. Significant volumes of heated reducing gas are, therefore, required to raise the ore bed temperature before efficient reduction occurs, thereby requiring increased amounts of reducing gas to be heated with the aforementioned attendant reduction component consumption problems. Moreover, the time required for high conversion of the ore in the reduction stage is quite long and, accordingly, adversely affects the overall economics for producing a given volume of sponge metal.

There are several reduction processes known which include separately preheating the metal oxide-containing ore prior to or during subjecting it to a hot reducing gas. See, for example, U.S. Pat. Nos. 3,684,486; 2,793,946; and 2,915,379, to name a few. More specifically, U.S. Pat. No. 3,684,486 describes a multi-reactor process wherein an ore bed is separately preheated prior to the conventional reduction stage with a hot non-reducing gas stream produced by combustion of a fuel, e.g., gaseous hydrocarbons, partially depleted reducing gas, etc., with at least a stoichiometric quantity of combustion air. The separate preheating of the ore bed with the hot non-reducing gas is described as improving the resulting sponge iron integrity as well as reducing overall processing time. However, this patent also describes employing the reducing gas heating procedure of the process of U.S. Pat. No. 2,900,247, for the ore reduction step and, accordingly, suffers from the same attendant disadvantages mentioned above.

U.S. Pat. No. 2,915,379 similarly discloses separately preheating the metal-containing ore by contact with combustion gas produced by combustion of a fuel with air. However, the process described in this patent also includes a reduction step wherein the reducing gas stream is heated to 1300° F.–1600° F. by conventional indirect heat exchange, i.e., by employment of a conventional gas heater or the like.

U.S. Pat. No. 2,793,946 discloses a preheating iron ore in a conventional vertical stage moving bed reactor system by combusting depleted reducing gas with air in the presence of the ore in the reactor. But, the preheated ore is then contacted and reduced with a reducing gas stream passed directly therethrough from a reducing gas generator without gas preheating.

Further, several patents are known which include recirculating portions of gas streams used for reduction and cooling. See, for example, U.S. Pat. Nos. 3,904,397, 3,890,142, and 3,423,201 describe such improvements in processes employing semi-continuous multi-reactor systems and U.S. Pat. Nos. 3,765,872, 3,770,421, 3,779,741, and 3,816,102 disclose such process improvements in vertical shaft moving bed reactor systems. The patents describe processes which include establishing closed loop reducing gas circuits for recirculating a portion of reducing gas effluent from the reducing reactor or zone and/or cooling gas effluent from the cooling reactor or zone for mixing with a reducing gas stream rich in reducing components, or for enrichment in a catalytic reducing gas reformer and ultimately used as the hot reducing gas stream for the reducing step. Additionally, closed loop cooling gas circuits are described wherein portions of reducing gas effluent from the reducing reactor or zone, rich reducing gas from a catalytic reformer unit and/or methane are circulated and used as the cooling gas in the respective sponge metal cooling step.

Although the processes described in the above patents do provide improved efficient use of reducing gas produced through recirculation and utilization of partially depleted reducing gas, the processes still require combusting or burning a portion of the reducing gas stream components for preheating the reducing gas passed to the reduction reactor or zone and, accordingly, suffer from the attendant disadvantages mentioned above. Moreover, in these processes, the described cooling and reducing gas circuits are tied in such that the operation of both the reduction and cooling steps are necessarily dependent upon each other. These described tie-ins significantly reduce the capability of operating any or all of the processing steps independently, if required for the production of sponge metal from varying types of metal oxide-containing materials.

An additional discussion of possible pertinent prior art is found in my co-pending application, Ser. No. 904,977 filed May 11, 1978.

SUMMARY OF THE INVENTION

The present invention is an improved direct gaseous reductional process for the production of sponge metal that substantially overcomes the above-mentioned problems and disadvantages associated with known prior art processes. In accordance with the present invention, a mass of particulated metal oxide-containing material, e.g., iron ore, is initially separately preheated by contacting it with a hot combustion gas stream depleted of free oxygen generated by mixing and combusting a fuel with no more than a stoichiometric amount of an oxygen-containing gas whereby the temperature of the mass is rapidly elevated to a desired level below the material melting point, preferably to or near reduction temperature. The preheated mass is then reduced by contacting it with a hot reducing gas stream produced by intimately mixing a reducing gas stream composed primarily of hydrogen and carbon monoxide with a hot combustion gas stream depleted of free oxygen generated in the same manner as that employed in the above preheating step. The mixing of the reducing gas and generated hot combustion gas streams causes the reducing gas to be rapidly heated without depleting any of the reducing components. Moreover, the resulting hot reducing gas stream is produced and passed through the metal oxide-containing material mass at a higher elevated temperature than heretofore attained by known reducing gas heating processes.

Upon completion of reduction the resulting sponge metal is then cooled by contacting the mass with a cool gas which, in a preferred embodiment, is obtained by cooling and circulating a portion of the combustion gas effluent from the above preheating and/or a portion of partially depleted reducing gas from the above reduction for use as the cooling gas.

The process of the invention can be carried out either semi-continuously in a multi-reactor system or continuously in a moving bed vertical shaft reactor system and provides high conversion of metal oxide-containing materials to sponge metal in reduced periods of time with efficient use of fuel and reducing gas per volume of material treated. Moreover, the process provides improved flexibility in overall operation whereby each operative step may be carried out independently and/or simultaneously with each other.

BRIEF DESCRIPTION OF THE DRAWINGS

The present invention can best be understood by reference to the accompanying drawings wherein.

DETAILED DESCRIPTION OF THE PREFERRED EMBODIMENTS

Figure 1:
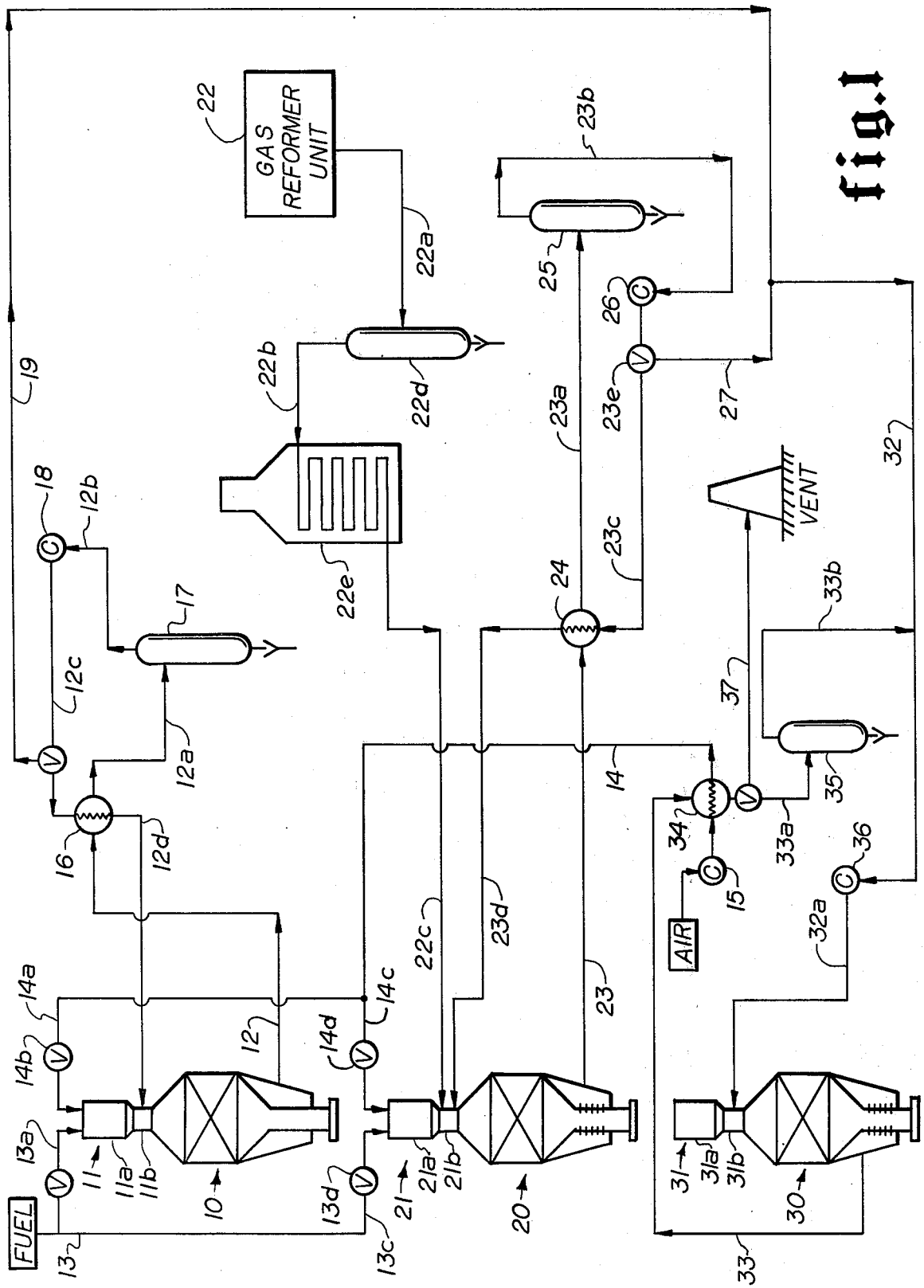
FIG. 1 is a schematic flow diagram illustrating a semi-continuous fixed bed multi-stage reactor system arranged for carrying out the reductional method of the present invention.

The process of the present invention will now be more particularly described as it may be carried out in a fixed bed multi-reactor system. Referring to FIG. 1, the multi-reactor system there shown comprises a plurality of reduction reactors 10, 20 and 30 of conventional design which are arranged spatially in the order of operative processing steps in accordance with gas flows therethrough. Each reactor is provided with a gas heating apparatus 11, 21 and 31, respectively, of the type described and claimed in my co-pending U.S. patent application Ser. No. 904,977, titled "METHOD AND APPARATUS FOR PREPARING A REDUCING GAS STREAM", filed on even date herewith, which is incorporated by reference herein as if copied in full.

As with conventional reductional processes carried out semi-continuously in multi-reactor systems, the operative steps of the present invention are generally performed simultaneously in separate reactors. As illustrated in FIG. 1, the process will be initially described with reactor 10 operating as a production (loading-unloading) and preheating reactor wherein the ore preheating step is performed, reactor 20 operating as a reduction reactor wherein the ore reduction step is performed, and reactor 30 operating as a cooling reactor wherein the cooling step is performed.

As described in my co-pending patent application Ser. No. 904,977, each gas heating apparatus 11, 21 and 31, respectively, is comprised of a combustion chamber 11a, 21a and 31a interconnected with a gas mixing chamber 11b, 21b and 31b communicating with the reactor 10, 20 and 30, respectively. Furthermore, as more specifically described hereafter, each combustion chamber 11a, 21a and 31a is designed to combust or burn a fuel with an oxygen-containing gas to rapidly generate an extremely hot combustion gas stream which may be intimately mixed with other gas streams in the mixing chamber 11b, 21b and 31b or directly injected into the respective reactor 10, 20 and 30.

In the cycle of operation shown in FIG. 1, a mass of metal oxide-containing material is initially placed in the production-preheating reactor 10 in a known manner. Although the process of the invention may be employed for producing sponge metal from substantially any type of metal oxide-containing material, it is particularly adapted for reducing particulated iron ore to sponge iron. Hence, the metal oxide-containing material to be treated will hereafter be referred to as iron ore. As known, the iron ore feed is normally comminuted, particulated or otherwise in lumped form for increased surface area exposure to process gas streams.

In accordance with the process of the invention, a hot combustion gas stream depleted of free oxygen is generated in the gas heating apparatus combustion chamber 11a and injected directly into the reduction-preheating stage reactor 10. The hot combustion gas stream passes continuously through the entire mass of iron ore loaded therein and is removed from the reactor 10 through line 12 to rapidly raise the temperature of the ore mass to or near optimum reduction temperatures.

The hot combustion gas stream is generated as briefly mentioned above by mixing and combusting or burning a fuel with no more than a stoichiometric quantity of an oxygen-containing gas in the combustion chamber 11a. This is accomplished by supplying a fuel, such as gaseous or liquid hydrocarbon, partially depleted reducing gas, etc., preferably natural gas or methane, to the combustion chamber 11a from a suitable fuel supply source through valve-controlled fuel lines 13 and 13a. Simultaneously, a stream of an oxygen-containing gas is supplied to the combustion chamber 11a from a suitable supply source such as through lines 14, 14a. Any oxygen-containing gaseous source, e.g., oxygen, air, etc., may be employed. However, due to the costs of operation, atmospheric air is preferred. As shown, the oxygen-containing gas supply source preferably is a suitable air compressor 15 communicating with the atmosphere and sized to supply combustion air at a desired flow rate and pressure.

As previously mentioned, the fuel is mixed and combusted with no more than a stoichiometric quantity of combustion air so as to produce a hot combustion gas stream essentially depleted of free oxygen to minimize oxidation of any portion of the iron ore mass, particularly contaminants, which would subsequently require utilization of more reducing gas during the reduction step. The particular composition and temperature of the hot combustion gas produced is dependent upon several factors, such as types of fuel and oxygen-containing gas streams employed, the ratio of the respective fuel and air streams fed to the combustion chamber 11a (consistent with the limitation that no more than a stoichiometric amount of air to be utilized), combustion chamber design, and the like. Theoretically, maximum heat is obtained by mixing and combusting the fuel with a stoichiometric quantity of oxygen-containing gas. Moreover, such stoichiometric combustion produces a hot combustion gas which is essentially inert, i.e., neither reducing nor oxidizing. By way of example, theoretical stoichiometric combustion of methane with air produces an essentially inert gas comprised primarily of nitrogen with minor amounts of carbon dioxide, carbon monoxide, hydrogen, etc., having a temperature within the range of from about 3000° F. to about 3400° F.

Preferably, the ore is preheated to or near reduction temperature in as short of time as possible with the inert combustion gas stream produced by the above stoichiometric fuel and air combustion. This can be readily achieved by adjusting the flow of fuel and combustion air to the combustion chamber 11a, such as by operating control valves 13b and 14b in respective supply lines 13a and 14a in a manner to provide stoichiometric flows of components, as will be apparent to those skilled in the art. However, as the inert combustion gas generated has a temperature of about 3000°–3400° F., its flow rate and/or temperature have to be adjusted before injection into the reactor 10 to prevent melting any portion of the iron ore mass. These adjustments are preferably achieved by adjusting the fuel and combustion air flow rates as required and by establishing a closed loop preheating gas circuit for recirculating a portion of the combustion gas effluent for mixing with the generated inert combustion gas stream. Recirculation of the combustion gas stream effluent provides the advantages of producing relatively high mass flow rates of heating gas through the ore bed and reducing the fuel requirements for generating the hot inert combustion gas.

As illustrated, the closed loop heating gas circuit preferably includes the gas generating apparatus 11, the reactor 10, a heat exchanger 16, a gas quenching unit 17 and a gas recirculating compressor or pump 18, respectively interconnected by heating gas recirculating lines 12, 12a, 12b, 12c and 12d. In operation, heating gas effluent removed from the reactor 10 through line 12 flows through the heat exchanger 16 and gas quencher 17, both of conventional design, via line 12a whereby the gas is cooled to about ambient temperature. In the gas quencher 17, free water and contaminants are stripped from the gas stream in a known manner. The cooled dry gas is raised in pressure by compressor 18 and introduced back through the heat exchanger 17 via line 12c where its temperature is raised by indirect heat exchange with the hot gas effluent in line 12. The reheated dry gas is then introduced via line 12d into the mixing chamber 11b for intimate mixing with the hot combustion gas generated in the combustion chamber 11a.

Preferably the heating gas effluent is recirculated or recycled and mixed with the initially generated hot combustion gas at a volume flow ratio sufficient to adjust the temperature of the hot combustion gas stream injected or discharged into the reactor 10 to within the range of from about 1500° F. to about 2200° F., optimally, at or near the upper end of this range. However, the volume flow rate of effluent gas recirculated should be altered as required to prevent melting of the ore bed, mentioned above. Moreover, a portion of recirculating gas may be removed from the gas circuit, such as through line 19 communicating with line 12c through valve 12e. It is particularly preferred to remove cooled dry heating gas effluent from the ore heating gas circuit at a volume flow rate substantially equal to the sum of the volume flow rates of fuel and combustion air fed to the combustion chamber 11a to maintain about the same pressure throughout the circuit. As described more particularly hereafter, line 19 communicates preferably with the cooling reactor 30 via lines 32 and 32a so that the portion of cooled dry heating gas effluent removed can be recirculated thereto for use in the cooling step.

In operation, the production-heating stage reactor 10 can usually be unloaded of cooled reduced sponge iron, loaded with fresh ore and heated to or near reduction temperature, in less time than that required for reduction simultaneously being carried out in the reduction stage reactor 20. When such occurs, it is preferred to adjust the fuel and combustion air stream flows so that an excess stoichiometric quantity of fuel is mixed and combusted in combustion chamber 11a. The hot combustion gas stream will then contain higher levels of reducing components, i.e., hydrogen and carbon monoxide, so that a minor amount of ore reduction will be achieved in reactor 10 thus reducing the amount of reduction and attendant time required during the reduction stage.

An ore mass preheated as described above is simultaneously reduced by passing a hot reducing gas stream therethrough in reactor 20 which, during the cycle now being described, operates as a reduction stage reactor. The reducing gas employed is preferably comprised primarily of hydrogen and carbon monoxide generated by the catalytic reformation of a gaseous hydrocarbon, e.g., natural gas or methane, with steam and/or carbon dioxide. Catalytic gas reformers and methods of their operation for producing such reducing gas streams are well-known in the art and, therefore, will not be more particularly described. As illustrated, the reducing gas is supplied to the reduction stage reactor 20 from a suitable gas reformer unit 22 via lines 22a, 22b and 22c. The reducing gas stream from the reformer unit 22 is preferably cooled and stripped of free water and contaminants by passage through a gas quenching unit 22d of conventional design and preheated by passage through a gas heater 22e. The gas heater 22e is of conventional design and operates by indirect heat exchange of the reducing gas stream with a hot combustion gas stream produced by mixing and combustion of air and fuel.

The initial preheating of the reducing gas in gas heater 22e reduces the amount of subsequent heating which must be achieved before the reducing gas is passed through the ore bed in reactor 10. However, as will become more apparent below, such initial preheating in gas heater 22e may be completely eliminated if desired, in view of the reducing gas heating procedure employed in the present invention.

More particularly, the hot reducing gas stream injected into the reduction stage reactor 20 is produced in accordance with the reducing gas preheating procedure described in my above-mentioned co-pending U.S. patent application Ser. No. 904,977. This procedure includes generating a hot combustion gas stream depleted of free or available oxygen by mixing and combusting a stream of fuel with no more than a stoichiometric quantity of an oxygen-containing gas and then intimately mixing the heating or hot combustion gas with the preheated reducing gas stream whereby the temperature of the reducing gas stream is rapidly raised to within the range of from about 1500° F. to about 2300° F. Rapid preheating of the reducing gas stream is thus obtained without depleting any reducing components, i.e., hydrogen and carbon monoxide, through combustion.

In the system illustrated in FIG. 1, a suitable fuel, i.e., methane, natural gas, etc., is fed from a fuel supply via fuel lines 13, 13c to the reducing gas heating apparatus combustion chamber 21a. Simultaneously, an oxygen-containing gas stream, preferably atmospheric air, is fed to the combustion chamber 21a from a suitable supply, preferably air compressor 15, via lines 14, 14c. The fuel and air streams are mixed and combusted or burned in the combustion chamber 21a to produce the hot combustion gas stream as described above for the preheating step. The generated heating or hot combustion gas stream is then discharged into the mixing chamber 21b and intimately mixed with the preheated reducing gas flowing from the gas reformer unit 22 whereby the reducing gas temperature is rapidly raised to within the above-mentioned range.

The flow rates of the combustion air and fuel streams are regulated, such as by operating valves 13d and 14d, respectively, in a known manner, so that no more than a stoichiometric quantity of air is mixed and combusted with the fuel, resulting in generating the hot combustion gas stream essentially depleted of free or molecular oxygen. As in the preheating step, stoichiometric quantities of combustion air and fuel may be employed to generate a substantially inert hot combustion gas stream. Additionally, less than stoichiometric quantity of combustion air to fuel mixtures may be employed if desirable. However, it is essential that no more than a stoichiometric quantity of combustion air be employed, for any free or molecular oxygen present in the generated hot combustion gas stream may cause unwanted combustion or burning of some of the reducing components in the reducing gas upon mixture therewith in the mixing chamber 21b. Preferably, the fuel and combustion air streams are mixed and combusted in stoichiometric quantities to produce the essentially inert hot combustion gas stream at theoretically maximum obtainable temperatures. Such reduces the fuel requirements for heating the reducing gas to the desired reduction temperature.

As pointed out above, the mixing of the hot combustion gas generated rapidly raises the temperature of the reducing gas without depleting any of the hydrogen and carbon monoxide reducing components, thus reducing the amount of reducing gas required to be generated in the gas reformer unit 22 for reducing a given volume of iron ore. Moreover, due to the extremely high temperature of the hot combustion gas stream, relatively low volume ratios of hot combustion gas to reducing gas need be employed to heat the reducing gas to within the above range. Thus, the resulting hot reducing gas stream mixture is not adversely diluted to a point which would adversely affect reduction of the iron ore.

As the hot reducing gas stream passes through the ore bed in the reduction stage reactor 20, it is partially depleted of reduction components which react with the oxides of the iron ore in accordance with the known reduction reaction thereby resulting in the formation of particulated sponge iron. The partially depleted reducing gas, referred to hereafter as reducing tail gas, is removed from the reactor 20 at an opposite end relative to the gas heating apparatus 21 via line 23. Preferably, to provide further efficiency in reducing gas utilization, a portion of the reducing tail gas stream in line 23 is recirculated and mixed with the reducing gas and hot combustion gas in the mixing chamber 21b by establishing a closed loop reducing gas circuit. As illustrated, the closed loop reducing gas circuit includes the gas heating apparatus 21, the reduction stage reactor 20, a heat exchanger 24, a gas quencher 25 and a recirculating gas compressor 26 respectively interconnected by lines 23, 23a, 23b, 23c and 23d. As with the preheating gas circuit, the closed loop reducing gas circuit heat exchanger 24, gas quencher 25 and gas compressor 26 are of conventional design. Moreover, the reducing tail gas flowing through line 23 passes through the heat exchanger 24, line 23a and gas quencher 25 whereby it is cooled and stripped free of water and contaminants. The resulting cooled dry reducing tail gas then flows through line 23b, is pressurized by gas compressor 26 and passed through the heat exchanger 24 via line 23c where it is preheated by indirect heat exchange with the hot reducing tail gas flowing from the reduction chamber 20 through line 23. The resulting reheated reducing tail gas then flows through line 23d and is mixed with the reducing gas from the reformer and the hot combustion gas generated in combustion chamber 21a, completing the circuit.

The amount of reducing tail gas recirculated to mixing chamber 21b may vary as desired. Usually, at the beginning of the reduction stage the volume recirculation rate is low and is gradually increased as reduction nears completion for greater quantities of the reducing components are depleted at the beginning. Additionally, as with the recirculation of the heating gas effluent in the ore preheating step above described, the reducing tail gas may be recirculated as desired to control the temperature of the resulting hot reducing gas stream mixture in order to prevent melting of any portion of the iron ore in the reduction stage reactor 20 during reduction. Yet, it is particularly preferred to recirculate the reducing tail gas at a flow rate substantially equal to the sum of the flow rates of the reducing gas from the reformer, the fuel and the combustion air respectively passed to the gas heating apparatus 21. This may be readily achieved by removing a portion of the reducing tail gas from the closed loop gas circuit at a flow rate equal to that sum. As illustrated, a portion of the cooled dry reducing tail gas is preferably removed from the gas circuit through line 27 interconnected with line 23c via valve 23e. As shown, line 27 interconnects with line 32 so that the removed reducing tail gas can be passed through the cooling reactor. Accordingly, the cooling gas requirements of the process are readily provided by either or both of the respective closed loop gas circuits of the preheating and reduction stages.

As previously pointed out, during the cycle of the system now being described, reactor 30 operates at a cooling reactor with a cooling gas simultaneously being circulated therethrough to cool the reduced sponge iron to or near ambient temperature. As shown, cool dry gas comprised of either or both portions of cooled dry heating gas effluent and partially spent reducing gas respectively removed from the preheating and reducing gas closed loop circuits via lines 19 and 27 flows through line 32 and 32a to the mixing chamber 31b and is discharged into the cooling stage reactor 30. The cooling gas continuously passes through the hot reduced sponge iron mass and is removed from the reactor 30 via line 33 whereby the sponge iron temperature is rapidly lowered.

Preferably a portion of the hot cooling gas effluent is cooled and recirculated through the reactor 30 by establishing a closed loop gas circuit. As shown, the cooling gas closed loop circuit is substantially the same in design as the preheating and reducing gas circuits and similarly includes the gas heating apparatus 31, cooling stage reactor 30, a gas heat exchanger 34, a gas quencher 35 and a gas recirculation compressor 36 respectively interconnected by lines 33, 33a, 33b, 32 and 32a, all as described above. The cooling gas effluent removed through line 33 flows through the heat exchanger 34 and gas quencher 35 via lines 33 and 33a where it is cooled to about ambient temperature and stripped free of water and contaminants in the gas quencher 35. As shown, the heat exchanger 34 preferably has the combustion air from the source compressor 15 passed therethrough for indirect heat exchange with the hot cooling gas effluent stream thereby preheating the combustion air stream prior to being fed to combustion chambers 11a and 21a to improve combustion therein. The cooled dry cooling gas then flows through line 33b interconnected with line 32 and is mixed with the cooling gas flowing therethrough. The cooled dry gas mixture from line 32 is increased in pressure by recirculating gas compressor 36 and passed via line 32a to the gas mixing chamber 31b, thus completing the circuit.

The amount of cooling gas effluent recirculated may be varied as desired. However, it is preferred to recycle a volume amount substantially equal to the amount of heating gas effluent and/or reducing tail gas effluent circulated to line 32 to eliminate possible pressure differentials in the closed loop cooling gas circuit. Moreover, it is preferred to remove a portion of cooling gas from the circuit in an amount equal to the amount of cool dry preheating and/or reducing tail gas effluent circulated to the circuit. Such may be readily achieved, as shown, by removing a portion of cooling gas effluent from line 33a via valve 33c and line 37 and venting the effluent to the atmosphere.

At the end of the cycle described above, the reactors are functionally interchanged so that the reactor 10 becomes the reduction stage reactor, reactor 20 becomes the cooling stage reactor and reactor 30 becomes the production-preheating stage reactor. Such functional interchanging is made after each cycle is completed whereby a mass of ore passes through each process stage resulting in cooled sponge iron. It is pointed out that, in actual practice, the multi-reactor system includes appropriate piping and valving so that each reactor may be operated in the manner described above for each processing step of the present invention. The piping and valving required and the manner of switching various gas streams described to effect the reactor function interchange will be apparent to those skilled in the art.

Furthermore, as will be apparent to those skilled in the art, the process of the invention, when carried out in a multiple-reactor system as described above, provides significantly improved flexibility in overall operation as compared to prior art processes. Each process step carried out in the separate reactors may be performed substantially independently whereby, in the event of break-down or such similar problems in one reactor the remaining processing steps may be continued. That is to say, no one processing step is entirely dependent upon another single processing step. By way of example, in the event either of the reactors operating in the preheating or reducing stage becomes inoperative, the cooling step may still be performed with little, if any adverse affect upon efficiency.

Figure 2:
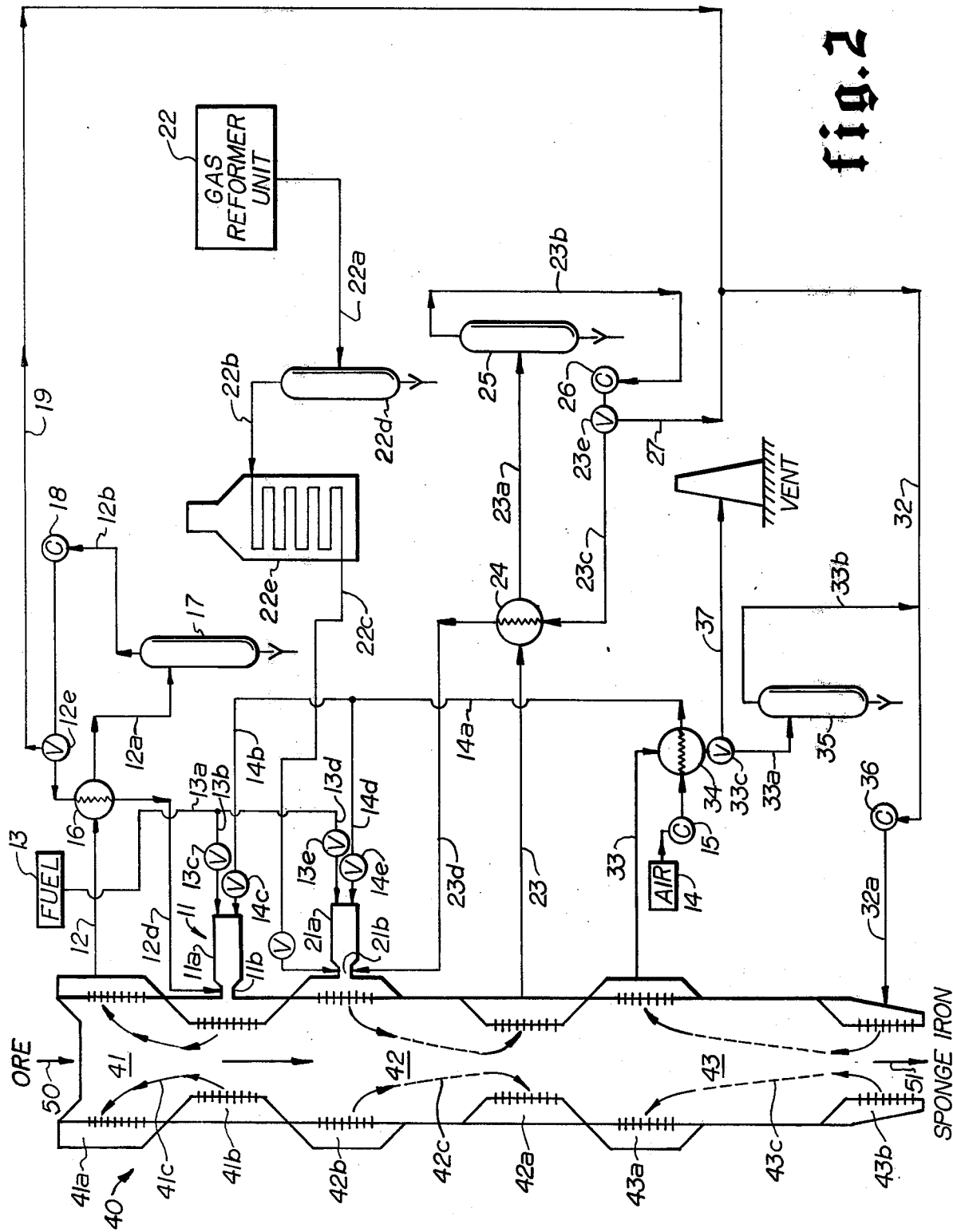
FIG. 2 is a schematic flow diagram illustrating a continuous moving bed vertical shaft reactor system arranged for carrying out the inventive process; and, FIG. 3 is a graph illustrating the beneficial effects of the process of this invention for producing a combustion gas stream having substantially no available oxygen to spend reducing gas constituents.

Turning now to FIG. 2 of the drawings, this Figure illustrates a moving bed vertical stage reactor system adapted to carry out the process of the invention. The continuous system of FIG. 2 includes a continuous moving bed vertical shaft reactor of conventional construction having a preheating zone 41 at the upper portion, a reducing zone 42 at the intermediate portion and a cooling zone 43 at the lower portion, respectively thereof. The vertical reactor shaft 40 is of conventional construction and is provided with a plurality of outlet gas plenum chambers 41a, 42a, 43a and inlet gas plenum chambers 41b, 42b, 43b which respectively form and separate the heating zone 41, reducing zone 12 and cooling zone 43 as illustrated.

Particulated or comminuted ore is charged to the top of the vertical reactor (arrow 50) and continuously flows downwardly therethrough. More particularly, it downwardly flows through the heating zone 41, wherein it is contacted with flowing hot combustion gas and heated to or near reduction temperature, through the reduction zone 42, wherein it is contacted with flowing hot reducing gas and reduced to sponge iron, then through the cooling zone 43 wherein it is contacted with flowing cooling gas and cooled to or near ambient temperature, and finally is removed from the bottom of the reactor 40 (arrow 51).

The vertical shaft reactor 40 may be operated at any desired pressure. In the event an elevated pressure is employed, the ore and sponge iron are respectively fed and removed from the reactor 40 by using suitable feed and discharge apparatus well-known in the art adapted to maintain the desired pressure in the reactor. However, as will be readily apparent to those skilled in the art, it is preferred to maintain substantially equal pressure throughout the respective heating, reducing and cooling zones, 41, 42, 43, so as to reduce intermingling of the heating, reducing and cooling gases respectively circulated therethrough.

In the continuous system illustrated in FIG. 2, a hot combustion gas stream for preheating, a hot reducing gas stream for reduction and a cooling gas stream for cooling are all respectively produced, made up, circulated, etc. and the respective effluent streams are recirculated, cooled, stripped of free water and contamination, etc. identically as previously described above for the multi-reactor system shown in FIG. 1. Moreover, this system of FIG. 2 includes the same closed loop preheating, reducing and cooling gas generating and treating apparatus, supply sources, gas effluent circulating lines, valving, and the like as that cycle of the multi-reactor system described above and illustrated in FIG. 1. Therefore, the same reference numerals of FIG. 1 are set forth in FIG. 2 to identify the same structures, flow lines and the like and only the differences in the respective systems will be described below.

As illustrated in FIG. 2, in the continuous system now being described, vertical shaft reactor 40 is provided with an apparatus 21 for heating reducing gas of the type described in my previously mentioned copending U.S. patent application Ser. No. 904,977 which communicates with the inlet gas plenum chamber 42b to discharge hot reducing gas through the reducing zone 42. Additionally, a similar reducing gas heating apparatus 11, operated as described above to produce the hot combustion gas stream essentially depleted of free oxygen, is mounted with the vertical reactor 40 which communicates with the inlet gas plenum chamber 41b for discharging hot combustion gas into the heating zone 41. On the other hand, inasmuch as the heating, reducing and cooling gas streams are simultaneously charged to reactor 40 and are not switched for change in functional operation as in the multi-reactor system, a dry cooling gas line 32a is interconnected directly with the inlet gas plenum chamber 43b for supplying cooling gas to the cooling zone 43.

Briefly, in the continuous system of FIG. 2 the process of the present invention is carried out by generating a hot combustion gas stream essentially depleted of free oxygen as described above in the gas heater combustion chamber 11a and continuously passing the hot combustion gas through the heating zone 41 via the inlet gas plenum chamber 41b and the outlet gas plenum chamber 41a, countercurrently, as shown by arrows 41c, with the ore flowing downwardly therethrough. The passage of the hot combustion gas through the downwardly moving ore raises its temperature to or near the reduction temperature. Preferably, the hot combustion gas discharged into the heating zone is achieved by recirculating and mixing a portion of the heating gas effluent with the hot combustion gas produced in the combustion chamber 11a as well as by controlling the combustion of the oxygen-containing gas and fuel streams therein. As in the system of FIG. 1, a portion of the preheating gas effluent is recirculated by pressure through the preheating gas closed loop circuit, i.e., through gas heater 16, gas quencher 17, recirculating and gas compressor 18 to mixing chamber 11b via lines 12, 12a, 12b, 12c and 12d. As described above, during recirculation, the effluent is cooled, stripped of contaminants and a portion thereof removed from the circuit via valve 12e and line 19. The remaining recirculated portion is reheated in heater 16 and flowed to the mixing chamber 11b. It is, of course, preferred to heat the flowing ore to or near reduction temperature as rapidly as possible as it flows through the heating zone 41. However, as previously mentioned, caution should be taken to prevent sintering any of the particulated ore. Such can be readily achieved by regulating the flow rates of fuel and combustion air to the combustion chamber 11a and the hot combustion gas effluent recirculation rate without undue experimentation.

Simultaneously, the hot reducing gas stream produced as above described in accordance with the procedure of my copending U.S. patent application Ser. No. 904,977 is introduced into the reducing zone 42 through the inlet gas plenum chamber 42b and removed therefrom through the outlet gas plenum chamber 42a and line 23 interconnected therewith. The hot reducing gas is comprised primarily of hydrogen and carbon monoxide and passes cocurrently (arrows 42c) through the ore flowing therethrough whereby the ore is reduced to sponge iron. As in FIG. 1, a portion of the reducing gas effluent is recirculated and mixed with reducing gas from the reformer unit 22 and hot combustion gas generated in combustion chamber 21a in the mixing chamber 21b for improved reducing gas utilization and control of reducing gas temperature discharged into the reducing zone 42. Such recirculation is carried out via the reducing gas circuit including the heat exchanger 24, gas quencher 25, gas recirculating compressor 26 and interconnecting lines 23, 23a, 23b, 23c and 23d in the same manner previously described. Similarly, the flow rates of fuel and oxygen-containing gas through the combustion chamber 21a, the flow rate of reducing gas from the reformer 22 and recirculation rate of partially spent reducing gas effluent in the reducing gas circuit may be varied as required to provide maximum ore reduction in the reducing zone 42 in the manners described above without undue experimentation.

As the reduced sponge iron flows downwardly from the reducing zone 42 through the cooling zone 43 it is rapidly cooled to or near ambient temperature by contact with the cooling gas simultaneously circulated therethrough. The cooling gas, comprised of a portion of cool, dry reheating gas effluent removed from the heating gas circuit via valve 12e and line 19 or a portion of partially spent reducing gas effluent removed from the reducing gas circuit via valve 23e and line 27, or mixtures thereof, is continuously introduced into the cooling zone 43 via the inlet gas plenum chamber 43b. The cooling gas is removed therefrom through the outlet gas plenum chamber 43a and line 33. As shown, it is preferred that the cooling gas be circulated through the cooling zone 43 countercurrent (arrows 43c) to the downward flow of sponge iron passing therethrough so that the sponge iron removed from the reactor 40 will be substantially at ambient temperature. Cocurrent cooling gas flow would obviously produce undesirable results. As described above, at least a portion of the cooling gas effluent is cooled, stripped of water and recirculated continuously for reuse through the cooling gas circuit which includes the heat exchanger 34, gas quencher 35, gas circulating compressor 36 and respective interconnecting lines 33, 33a, 33b, 32 and 32a.

Referring to FIG. 3, a graph is illustrated which indicates the increase in amount of reducing constituents available for the reduction of oxides from oxide-ladened metal ores by utilizing the process of this invention for heating reducing gas utilized in the reactor 10 and/or the reactor 20 of FIG. 1 and in the preheating zone 41 and the reducing zone 42 of the continuous process of FIG. 2. The graph of FIG. 3 has an ordinate indicative of air volume flow and an abscissa indicative of the volume of reducing gas constituents produced. Line 60 represents the base case as practiced in the prior art U.S. Pat. No. 2,900,247. Each of the other graph lines 61-65 indicate application of the method of reducing the preheating gas for the preheating stage and the reducing gas for the reducing stage of this invention utilizing no more than a stoichiometric amount of air. Graph line 61 represents the relative volume of reducing gas constituents produced when the tail gas is mixed with the fresh reducing gas as both are heated by the combusted gas having no more than a stoichiometric amount of air. Graph line 62 represents an even better situation with respect to the production of reducing gas constituents wherein the fuel directed through fuel line such as 13 of FIG. 1 is methanol and no more than a stoichiometric amount of air is combusted with the methanol to produce the heating gas which is mixed with the preheated reducing gas. Graph line 63 represents the utilization of methanol as a fuel but with 120% of the stoichiometric amount of methanol needed as compared to a stoichiometric amount of air so that additional reducing gas constituents are produced during combustion itself. Graph line 64 indicates the utilization of methane as a fuel wherein stoichiometric amounts of methane and oxygen are combined; and, graph line 65 represents the utilization of 120% of a stoichiometric amount of methane indicating even further added benefits in terms of the volume of reducing gas constituents produced per volume of air flow. It should be understood that the graph of FIG. 3 is a model which has been produced from computerized models representing anticipated reactions which occur utilizing the process of this invention. For this reason, actual data in commercial production, which has not been undertaken, may indicate some deviation from this graph. However, the graph of FIG. 3 clearly indicates that less reducing gas is wasted by utilizing only a stoichiometric amount of air in combustion with a stoichiometric amount of the fuel, or an excess thereof, provide superior results.

From the above description it will be apparent to those having skill in the art that the process of the present invention readily overcomes many of the problems associated with prior art processes for the production of sponge iron. The separate preheating and reducing steps of the process significantly reduce the time and reducing gas requirements for producing a given volume of sponge iron. Moreover, by employing portions of the heating gas effluent and/or partially depleted reducing gas effluent for cooling, in combination with independent production of heating gas, improved flexibility in overall operation of both fixed bed multiple reactor systems and continuous moving bed vertical shaft reactor systems is accomplished.

Many modifications and variations of the above-described invention may be made without departing from the spirit and scope thereof, and, therefore, only such limitations should be imposed as are indicated in the following claims.

I claim:

1. A process for the production of sponge metal by direct gaseous reduction of metal oxides, comprising:
   initially preheating a mass of particulated metal oxide, including
      mixing and combusting a stream of fuel with no more than a stoichiometric quantity of an oxygen-containing gas stream to produce a hot combustion gas stream which is depleted of substantially free oxygen; and
      passing the hot combustion gas stream through the metal oxide mass;
   reducing the preheated metal oxide mass to sponge metal by passing a stream of hot reducing gas through the mass, said hot reducing gas being comprised primarily of hydrogen and carbon monoxide heated to an elevated temperature required for metal oxide reduction by
      mixing and combusting a stream of fuel with no more than a stoichiometric quantity of an oxygen-containing gas stream to produce a hot combusion gas stream which is depleted of free oxygen; and
      intimately mixing the hot combustion gas stream with a stream of reducing gas comprised primarily of hydrogen and carbon dioxide to elevate the reducing gas stream temperature to said required metal oxide reducing temperature without depleting any hydrogen and carbon monoxide reducing components thereof; and
   cooling a resulting mass of reduced sponge metal by passing a stream of cool gas through the resulting mass.

2. The process of claim 1, wherein:
effluent of the combustion gas stream passed through the metal oxide mass for preheating is cooled and dried, and a portion thereof is circulated and passed through the resulting mass of reduced sponge metal for said cooling thereof.

3. The process of claim 1, wherein:
a portion of the cooled dried preheating combustion gas effluent stream is recirculated and mixed with the hot combustion gas stream prior to passing through the metal oxide mass for adjusting the temperature of the hot combustion gas stream and to form a closed loop preheating gas circuit.

4. The process of claim 1, wherein:
partially depleted effluent of the reducing gas stream passed through the preheated metal oxide mass for reduction thereof is cooled and dried, and a portion thereof is recirculated and mixed with the reducing gas stream and hot combustion gas stream for adjusting the temperature of the resulting hot reducing gas stream prior to passage through the preheated metal oxide mass and to form a closed loop reducing gas circuit.

5. The process of claim 4, wherein:
a portion of the cooled, dried partially depleted reducing gas effluent stream is circulated and passed through the resulting mass of reduced sponge metal for said cooling thereof.

6. The process of claim 5, wherein:
effluent of the preheating combustion gas stream passed through the metal oxide mass is cooled and dried, and a portion thereof is recirculated and mixed with the hot combustion gas stream prior to passing through the metal oxide mass for adjusting the temperature of the hot combustion gas stream and to form a closed loop preheating gas circuit.

7. The process of claim 6, wherein:
a portion of the cooled, dried preheating combustion gas effluent stream is circulated and mixed with the portion of cooled, dried partially depleted reducing gas effluent stream circulated and passed through the resulting mass of reduced sponge metal for said cooling thereof.

8. The process of claim 7, wherein:
a portion of effluent of the cooled gas stream passed through the resulting reduced sponge metal mass is cooled and dried, and is recirculated and mixed with the effluent preheating combustion gas stream and effluent reducing gas stream to form a closed loop cooling gas circuit.

9. The process of claim 1, wherein:
in said preheating step, the fuel stream is mixed and combusted with a stoichiometric quantity of a stream of an oxygen-containing gas to produce an essentially inert hot combustion gas stream.

10. The process of claim 1, wherein:
in said preheating step, a stream of fuel is mixed and combusted with less than a stoichiometric quantity of a stream of an oxygen-containing gas to produce a hot combustion gas stream containing at least some hydrogen and carbon monoxide reducing components for passing through the metal oxide mass to provide some reduction of the metal oxide mass during preheating thereof.

11. The process of claim 1, wherein:
in said reducing step, a stream of fuel is mixed and combusted with a stoichiometric quantity of an oxygen-containing gas stream to produce an essentially inert hot combustion gas stream which is mixed with the reducing gas stream to elevate the temperature of the reducing gas stream to the required reduction temperature.

12. The process of claim 1, wherein:
said process is carried out semi-continuously in multiple unit reactor system of the type in which separate bodies of metal oxide ore are simultaneously treated in a plurality of reactors of the system, and in which at least one of the reactors is maintained at a preheating stage for said preheating step, at least one of said reactors is maintained at a reduction stage for said reducing step and at least one of said reactors is maintained at a cooling stage for said cooling step, said method further being of the type in which each of said preheating, reducing and cooling steps are performed on a body of metal oxide ore maintained in each of the several reactors.

13. The process of claim 12, including:
passing the hot combustion preheating gas stream through the reactor maintained at the preheating stage, cooling and drying effluent of the hot combustion gas stream passed through said reactor and recirculating and mixing a portion of the cooled, dried effluent stream with the hot combustion gas stream for adjusting the temperature thereof prior to passage through the preheating stage reactor and to form a closed loop preheating gas circuit;
simultaneously passing the preheated reducing gas stream through the reactor maintained in the reduction stage cooling and drying effluent of the reducing gas stream passed therethrough, and recirculating and mixing a portion of the cooled, dried reducing gas effluent with the reducing gas stream and hot combustion gas stream for adjusting the temperature of the resulting hot reducing gas stream prior to passage through the reduction stage reactor and to form a closed loop reducing gas circuit; and
simultaneously circulating cooled, dried effluent gas selected from a portion of the cooled, dried preheating gas effluent stream, a portion of the cooled, dried reducing gas effluent stream, or mixtures thereof, to the reactor maintained in the cooling stage, passing the circulated gas stream therethrough, cooling and drying a portion of the effluent of the cooling gas passed through the cooling stage reactor and recirculating and mixing the cooled, dried cooling gas effluent with the circulated effluent gas stream to form a closed loop cooling gas circuit.

14. The process of claim 1, wherein:
said process is carried out continuously in a vertical shaft, moving bed reactor system of the type wherein a mass of metal oxide is continuously passed through a vertical shaft reactor having a preheating zone, wherein a portion of the metal oxide mass is contacted with the hot combustion gas stream circulated through said preheating zone for preheating the metal oxide to or near reduction temperature, a reducing zone, wherein a portion of the metal oxide mass is contacted with the hot reducing gas stream circulated therethrough the preheating zone for reducing the metal oxide to sponge iron, and a cooling zone, wherein reduced sponge metal passing therethrough is contacted with a stream of cooling gas circulated through the cooling zone for cooling the resulting sponge metal to or near ambient temperature.

15. The process of claim 14, including:
cooling and drying effluent of the hot combustion gas stream circulated through the preheating zone and recirculating and mixing a portion of the cooled, dried effluent gas with the hot combustion gas stream for adjusting the temperature thereof prior to circulation through the preheating zone and to form a closed loop preheating gas circuit;
simultaneously cooling and drying effluent of the hot reducing gas stream circulated through the reducing zone and recirculating and mixing a portion of the cooled, dried reducing gas effluent with the reducing gas stream and the hot combustion gas stream for adjusting the temperature of the resulting hot reducing gas stream prior to circulation through the reducing zone and to form a closed loop reducing gas circuit; and
simultaneously circulating a cooled, dried gas stream selected from a portion of cooled, dried preheating combustion gas effluent, a portion of cooled, dried reducing gas effluent, or mixtures thereof, to the cooling zone for circulation therethrough, cooling and drying a portion of effluent cooling gas circulated through the cooling zone and recirculating and mixing said portion with the circulated effluent gas stream to form a closed loop cooling gas circuit.

* * * * *